United States Patent
Goldman

(10) Patent No.: US 10,499,723 B2
(45) Date of Patent: Dec. 10, 2019

(54) WEARABLE MODULAR CARRYING SYSTEM AND METHODS OF USE

(71) Applicant: Santc Group, Inc., Columbia, SC (US)

(72) Inventor: Anthony R. Goldman, Columbia, SC (US)

(73) Assignee: SANTC Group, Inc., Columbia, SC (US)

( * ) Notice: Subject to any disclaimer, the term of this patent is extended or adjusted under 35 U.S.C. 154(b) by 0 days.

(21) Appl. No.: 15/760,364

(22) PCT Filed: Sep. 15, 2016

(86) PCT No.: PCT/US2016/051875
§ 371 (c)(1),
(2) Date: Mar. 15, 2018

(87) PCT Pub. No.: WO2017/048914
PCT Pub. Date: Mar. 23, 2017

(65) Prior Publication Data
US 2018/0289137 A1    Oct. 11, 2018

Related U.S. Application Data

(60) Provisional application No. 62/218,634, filed on Sep. 15, 2015.

(51) Int. Cl.
*A45F 5/02* (2006.01)
*A45F 5/00* (2006.01)
(Continued)

(52) U.S. Cl.
CPC ............ *A45F 5/021* (2013.01); *A45F 3/00* (2013.01); *A45F 3/005* (2013.01); *A45F 3/16* (2013.01); *A45F 5/00* (2013.01); *F16M 11/041* (2013.01); *A45F 2003/166* (2013.01); *A45F 2200/0575* (2013.01); *A45F 2200/0583* (2013.01); *F16M 13/04* (2013.01)

(58) Field of Classification Search
CPC .... A45F 5/021; A45F 5/00; A45F 3/00; A45F 3/16; A45F 3/005; A45F 2003/166; A45F 2200/0583; A45F 2200/0575; F16M 11/041; F16M 13/04
USPC .............................................. 224/148.4, 148.5
See application file for complete search history.

(56) References Cited

U.S. PATENT DOCUMENTS

| | | | | |
|---|---|---|---|---|
| 5,170,981 A | * | 12/1992 | Lin | .......................... B62J 11/00 |
| | | | | 224/414 |
| 5,456,393 A | * | 10/1995 | Mathis | ..................... A43B 5/16 |
| | | | | 224/148.4 |

(Continued)

OTHER PUBLICATIONS

Young, Lee W.; International Search Report and Written Opinion; PCT/US2016/051875; ISA/US; 13 pages; dated Feb. 21, 2017.

(Continued)

*Primary Examiner* — Nathan J Newhouse
*Assistant Examiner* — Lester L Vanterpool
(74) *Attorney, Agent, or Firm* — Nexsen Pruet, LLC; Todd A. Serbin

(57) ABSTRACT

A wearable modular carrying system, comprising: a belt; an attachment insert held next to the belt and configured with at least one of a locking post, with a top post prong and a bottom post prong, and a key-hole; and, a modular object configured for reversible attachment to the attachment insert.

17 Claims, 17 Drawing Sheets

(51) Int. Cl.
*A45F 3/00* (2006.01)
*A45F 3/16* (2006.01)
*F16M 11/04* (2006.01)
*F16M 13/04* (2006.01)

(56) References Cited

U.S. PATENT DOCUMENTS

| | | | |
|---|---|---|---|
| 5,604,958 A | 2/1997 | Anscher | |
| 5,628,433 A | 5/1997 | Deutsch | |
| 6,182,872 B1 * | 2/2001 | Six | A45F 3/00 224/148.3 |
| 6,971,562 B2 * | 12/2005 | Willows | A45F 3/16 224/148.4 |
| 7,237,703 B1 * | 7/2007 | Nathan | A45F 3/16 224/148.4 |
| 7,520,412 B2 * | 4/2009 | Willows | A45F 3/14 224/148.4 |
| 7,618,260 B2 | 11/2009 | Daniel et al. | |
| 8,919,623 B1 * | 12/2014 | Bergeron | A45F 5/02 224/148.4 |
| 8,985,409 B2 * | 3/2015 | Willows | A45F 5/00 224/148.1 |
| 9,119,975 B2 * | 9/2015 | Hu | A62B 25/00 |
| 9,591,915 B2 * | 3/2017 | Willows | A45F 5/021 |
| 9,854,793 B2 * | 1/2018 | Hawley, Jr. | A01K 97/06 |
| 2003/0209583 A1 | 11/2003 | Gresham | |
| 2004/0256428 A1 * | 12/2004 | Meggiolan | B62J 11/00 224/414 |
| 2005/0144706 A1 | 7/2005 | Taylor et al. | |
| 2006/0162135 A1 * | 7/2006 | Howell | A41D 13/0012 24/442 |
| 2007/0080182 A1 * | 4/2007 | Thatcher | A45F 3/14 224/148.4 |
| 2011/0042435 A1 * | 2/2011 | Weng | B62J 11/00 224/414 |
| 2012/0132680 A1 * | 5/2012 | Chen | A45F 3/18 224/148.4 |
| 2012/0280096 A1 * | 11/2012 | Goldman | B60N 3/101 248/224.8 |
| 2013/0119096 A1 | 5/2013 | Morgan et al. | |
| 2013/0206806 A1 | 8/2013 | Hu et al. | |
| 2014/0027477 A1 * | 1/2014 | deBeers | A45F 5/02 224/148.4 |

OTHER PUBLICATIONS

Newhouse, Nathan; International Preliminary Report on Patentability; PCT/US2016/051875; IPEA/US; 13 pages; dated Sep. 27, 2017.

* cited by examiner

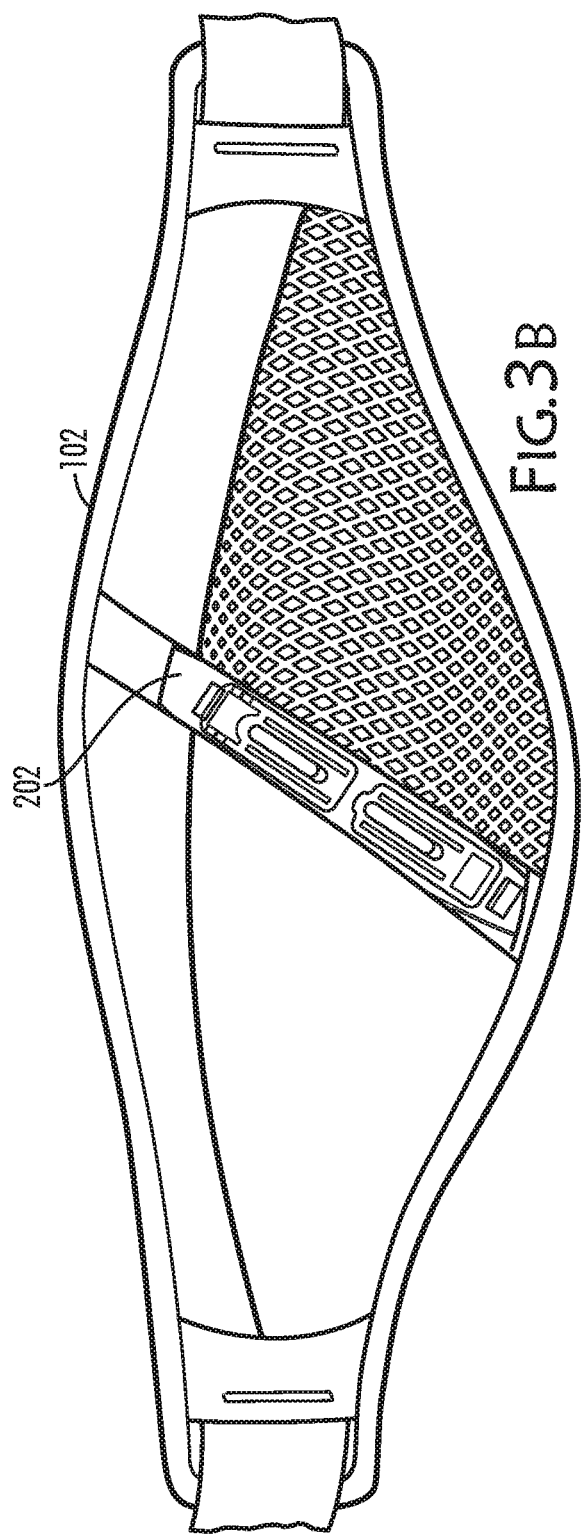

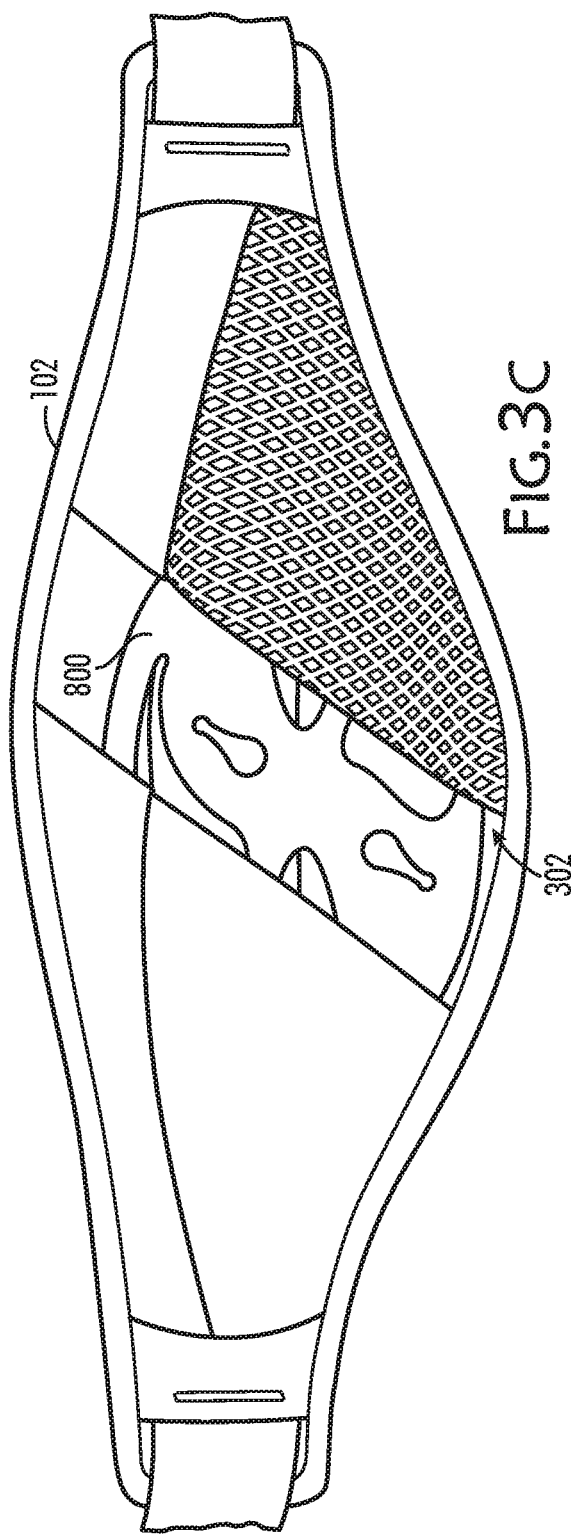

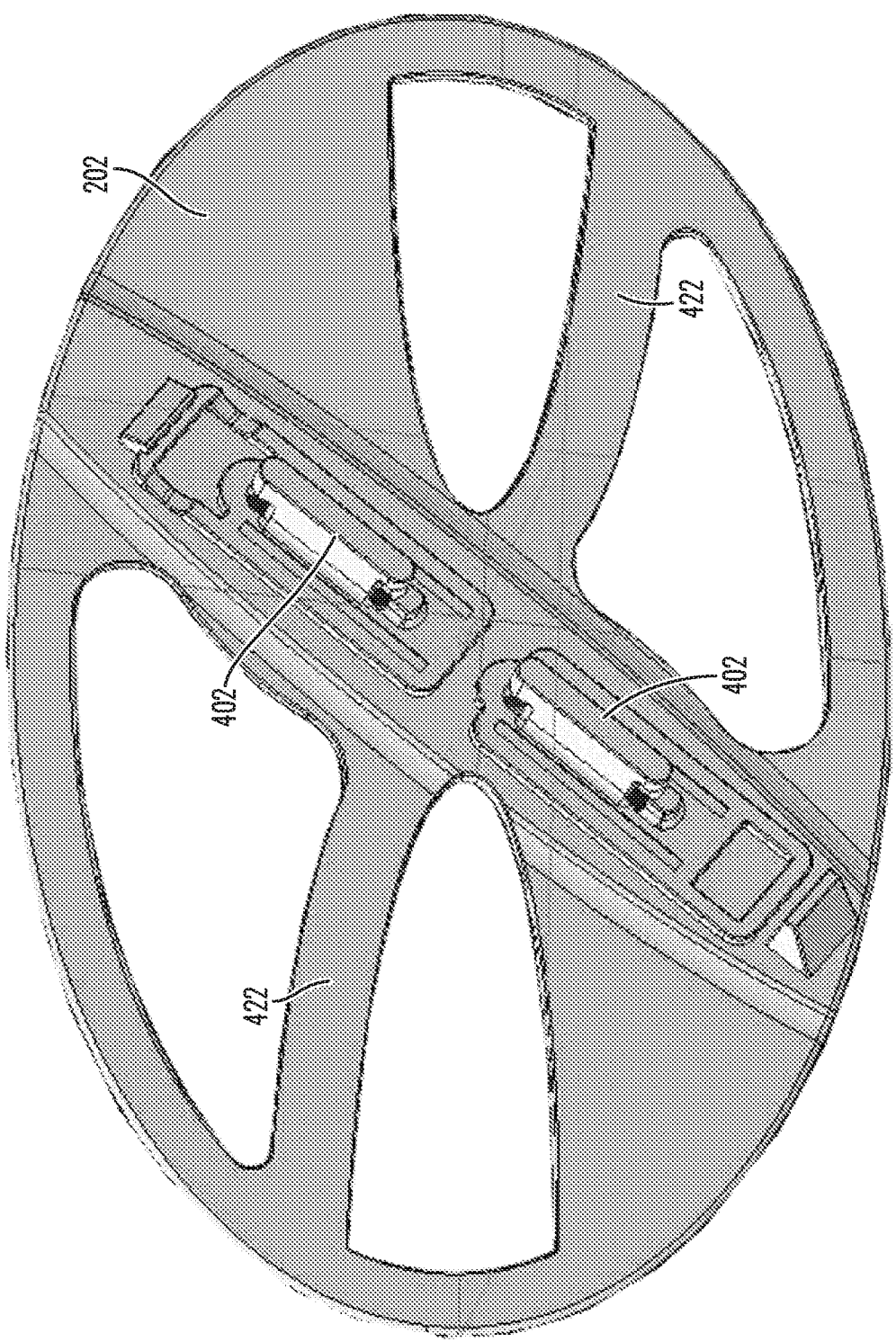

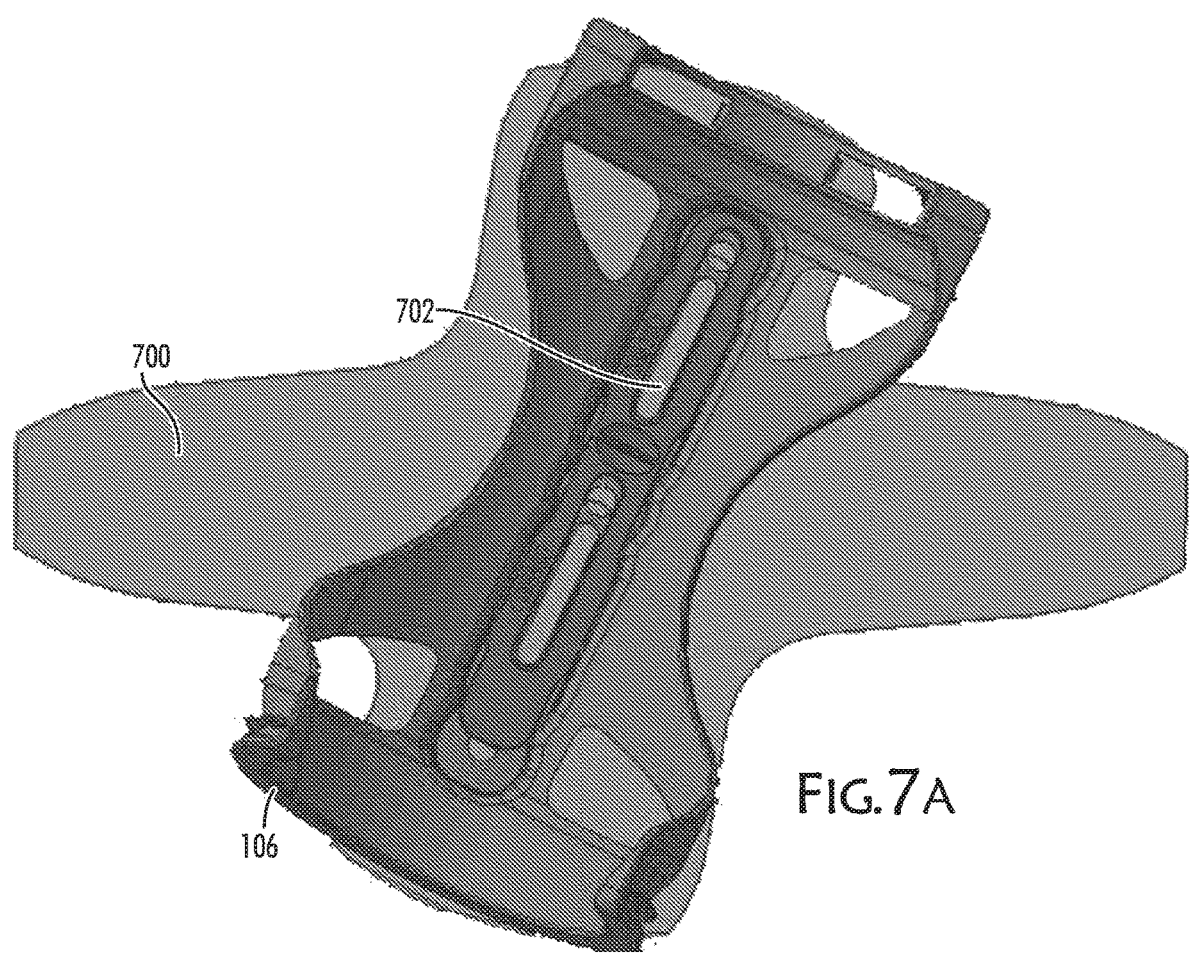

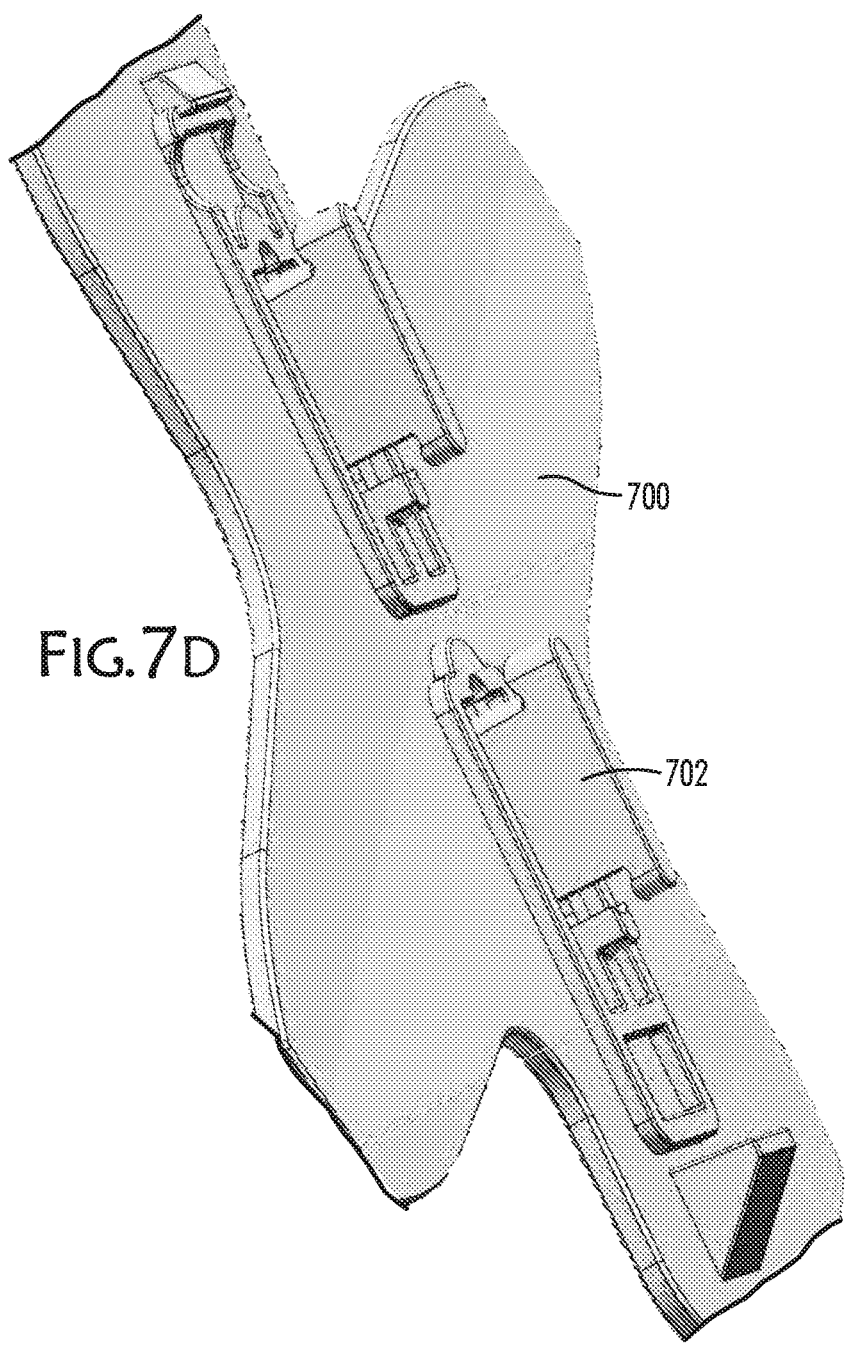

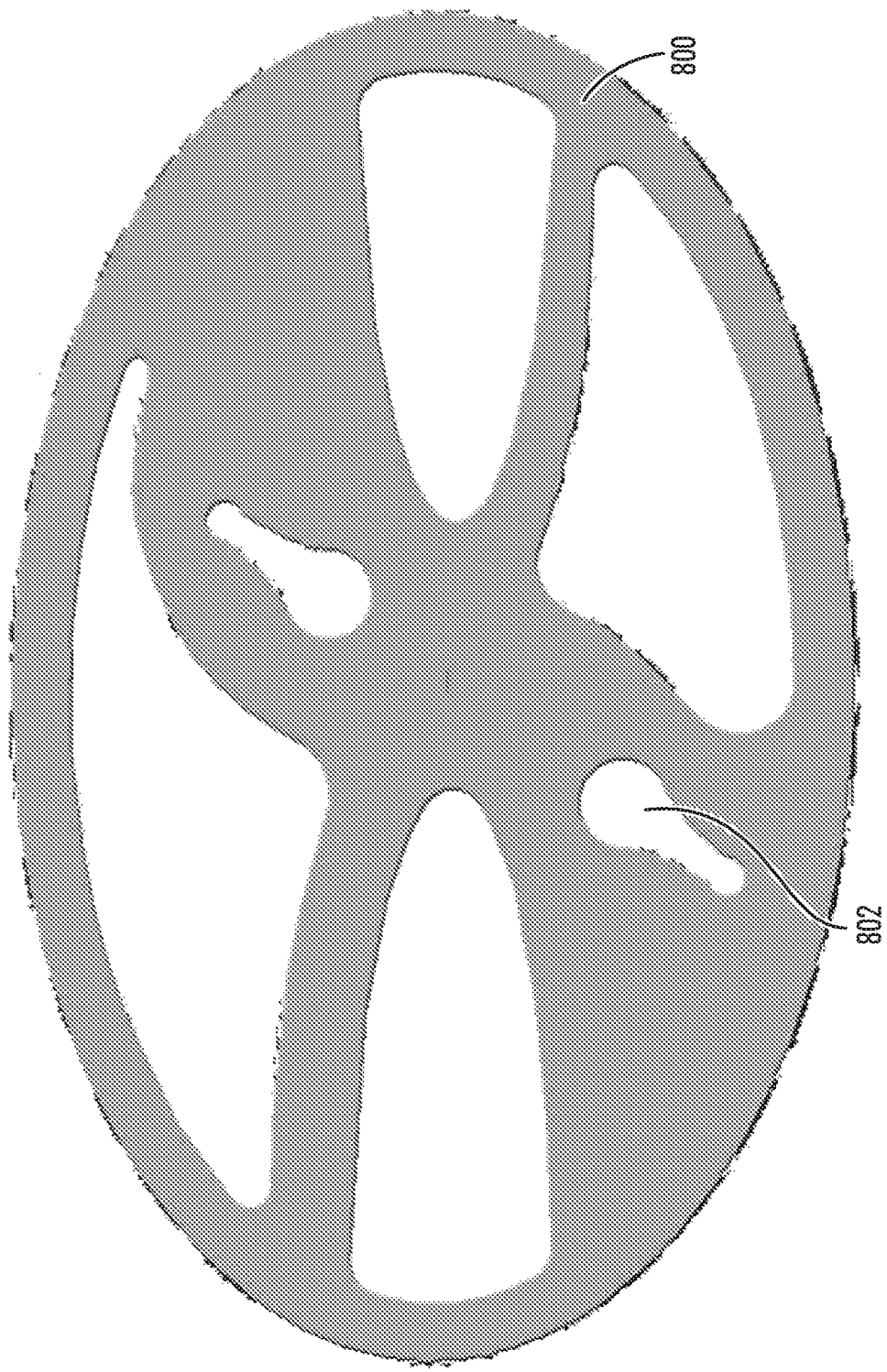

WEARABLE MODULAR CARRYING SYSTEM AND METHODS OF USE

RELATED APPLICATION/S

This application is a National Phase of PCT Patent Application No. PCT/US2016/051875 having an International filing date of Sep. 15, 2016, which claims the benefit of priority under PCT Article 8 of U.S. Provisional Patent Application Ser. No. 62/218,634 filed Sep. 15, 2015, the contents of which are incorporated herein by reference in their entirety.

FIELD AND BACKGROUND OF THE INVENTION

The present invention, in some embodiments thereof, relates to physical activity and, more particularly, but not exclusively, to a physical activity accessory.

Over the years, various hydration systems have been designed for runners, walkers, hikers and outdoor enthusiasts for the primary purpose of providing a means of carrying water hands free during strenuous exercise or recreational activity. Such products have been designed generally to be worn on the waist or on the back in order to allow for liquids to be accessibly within hands reach.

These types of product are generally available in two varieties: (1) those that use bottles that are worn around the waist; and, (2) those that use a bladder that are worn as a backpack. For the waist systems, the bottle is generally stowed inside some type of fabric sleeve or rigid (or semi rigid) cage. Removing the bottle from the sleeve or cage requires pulling the bottle upward in a vertical direction. While the current waist systems generally accomplish their primary purpose of allowing for the hands free transport of liquids, the universal complaint among end users is that it is nearly impossible to get the bottle in and out of the sleeve or cage, especially while trying to remain in motion. As a result, some end user will wear the bottle on the front of their waist in order to ease the difficulty of using the bottle. Others simply abandon using the system or choose to carry a bottle in their hand. For the backpack systems, the general complaints are that they are bulky and create too much body heat because of the large coverage of the back area. Also, the backpack systems dispense water through a hose which are difficult to clean and maintain, especially when sugary liquids collect inside the system.

Previous attempts in this area include, US20060097019, U.S. Pat. Nos. 7,712,196, 6,666,360, 6,401,993, 6,004,033, 5,060,833 and D444,295, the contents of which are incorporated herein by reference in their entirety.

SUMMARY OF THE INVENTION

According to an aspect of some embodiments of the present invention there is provided a wearable modular carrying system, comprising: a belt; an attachment insert held next to the belt and configured with at least one of a locking post, with a top post prong and a bottom post prong, and a key-hole; and, a modular object configured for reversible attachment to the attachment insert.

In an embodiment, the modular object is at least one of a magnetic bottle mount and magnetically active bottle combination, a basket, a holster, a tool holder, a flashlight holder.

In an embodiment, the system further comprises a locking clip configured with at least one slot sized and shaped as a counterpart to the locking post of the attachment insert.

In an embodiment, the magnetically active bottle is configured with a removable, metallic, continuous ring around a neck of the bottle and the magnetic bottle mount is configured with at least one magnet at a location on the bottle mount corresponding to the ring on the bottle when the bottle is seated in the bottle mount.

In an embodiment, the attachment insert is held next to the belt by at least one of stitching, fusing and adhesive.

In an embodiment, the at least one locking post of the attachment insert, the modular object and the locking clip interlace when reversibly attached together.

In an embodiment, the top post prong and the bottom post prong of the at least one locking post are configured differently, the top post prong configured for receipt of the modular object and the bottom post prong configured for receipt of a clip tab of the locking clip.

In an embodiment, the attachment insert is held next to the belt by a pocket configured for placement of the attachment insert therein.

In an embodiment, the attachment insert is ovoid shaped for distributing the weight of the modular object therearound.

In an embodiment, the attachment insert is provided with at least one support to provide flexibility control.

In an embodiment, the attachment insert is x-shaped for distributing the weight of the modular object among the extensions of the x-shape.

In an embodiment, the magnetic bottle mount is configured with at least one slide slot in which a slide of the locking clip is positioned, where the dimensions of the slide slot define the movement of the locking clip.

In an embodiment, the attachment insert further comprises a top latch, a bottom wedge and at least one spacer.

In an embodiment, the modular object locks onto the attachment insert between multiple stabilizing points.

In an embodiment, the multiple stabilizing points include at least one of the top latch, the bottom wedge, the at least one spacer, the top post prong and the bottom post prong.

In an embodiment, at least one of the top latch, the bottom wedge and the at least one spacer prevent the modular object from moving longitudinally, and at least one of the top post prong and the bottom post prong prevent the modular object from moving laterally.

In an embodiment, the locking clip is configured with a user interface feature.

There is further provided, a method of using a wearable modular carrying system, comprising: attaching a modular object to an attachment insert configured with at least one locking post by, resting a top surface of the attachment insert against the back surface of the modular object so that the at least one locking post of the attachment insert is placed within and through a slot of the modular object, sliding the modular object longitudinally along the top surface of the attachment insert, and, reversibly locking the modular object onto the attachment insert by sliding a portion of the modular object under a top post prong of the locking post.

In an embodiment, the method further comprises attaching a locking clip to the system to reversibly lock the modular object to the attachment insert by, placing the locking clip over the at least one locking post of the attachment insert and abutting an inner surface of the modular object, such that the modular object is between the attachment insert and the locking clip and the locking post is placed in and through a slot in the locking clip, sliding the locking clip along the inner surface of the modular object, and, reversibly locking the locking clip onto the attachment insert, with the modular object therebetween, by sliding a clip tab of the locking clip under a bottom post prong of the locking post.

In an embodiment, the method further comprises removing the modular object from the wearable modular carrying system by, sliding the locking clip such that a clip tab of the locking clip becomes dislodged from a bottom post prong of the locking post, and, applying sliding force to the modular object to dislodge it from the top post prong of the locking post.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWING(S)

Some embodiments of the invention are herein described, by way of example only, with reference to the accompanying drawings. With specific reference now to the drawings in detail, it is stressed that the particulars shown are by way of example, are not necessarily to scale, and are for purposes of illustrative discussion of embodiments of the invention. In this regard, the description taken with the drawings makes apparent to those skilled in the art how embodiments of the invention may be practiced.

In the drawings:

FIG. 3B is a front view of a wearable modular carrying system without a bottle mount attached;

FIG. 3C is a front view of a wearable modular carrying system with a pocket for securely holding an attachment insert;

FIG. 4A is a perspective view of an attachment insert of a wearable modular carrying system;

FIGS. 7A-7D are views of an extruded surface attachment insert of a wearable modular carrying system;

FIG. 8 is a key-hole attachment insert of a wearable modular carrying system; and, FIG. 9 is a flowchart of a method of using a wearable modular carrying system.

DESCRIPTION OF SPECIFIC EMBODIMENTS OF THE INVENTION

Figure 1:
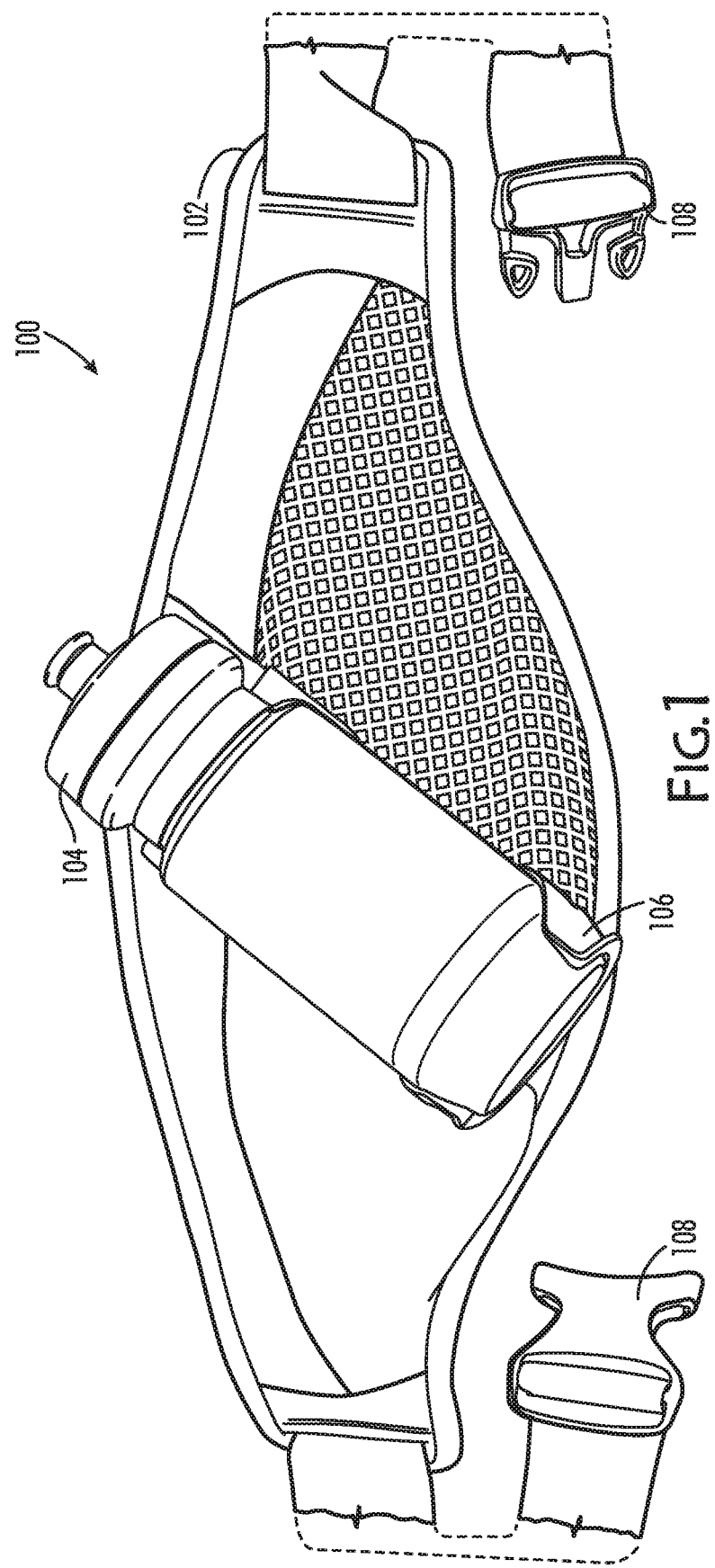
FIG. 1 is a perspective view of a wearable modular carrying system.

The present invention, in some embodiments thereof, relates to physical activity and, more particularly, but not exclusively, to a physical activity accessory.

Before explaining at least one embodiment of the invention in detail, it is to be understood that the invention is not necessarily limited in its application to the details of construction and the arrangement of the components and/or methods set forth in the following description and/or illustrated in the drawings The invention is capable of other embodiments or of being practiced or carried out in various ways.

FIG. 1 is a perspective view of a wearable modular carrying system 100, in accordance with an aspect of the disclosure. The wearable modular carrying system 100 is configured to provide a convenient means of wearing attachable modules, such as a hydration system, that is easy to use while engaged in strenuous exercise or other recreational activities. In some aspects of the disclosure, the wearable modular carrying system 100 comprises a belt 102, a bottle 104 configured to be magnetically active, a bottle mount 106 configured with at least one magnet as a counterpart to the magnetically active bottle 104, an attachment insert 202 (not shown) and a locking clip 204 (not shown), the various components shown and described in more detail with respect to the exploded view of FIG. 2. In some aspects, because the wearable modular carrying system 100 is not housed inside a sleeve or a cage, like conventional solutions, the bottle 104 can be removed and stowed in a way that is relatively effortless and/or more suited for use while the user remains in motion. In an aspect, removing the bottle simply requires grabbing the bottle 104 and pulling it outward from the bottle mount 106 and away from the user's body. The wearable modular carrying system 100 is configured for easy stowing of the bottle 104, wherein getting the bottle 104 sufficiently close to the bottle mount 106 will cause the magnetic attraction between the bottle 104 and the bottle mount 106 will return the bottle 104 to its seated position within the bottle mount 106, and subsequently, in the belt 102. The process of using the wearable modular carrying system 100 is described in more detail with respect to FIG. 9. In an aspect of the disclosure, the wearable modular carrying system 100 is configured, for example with an optionally removable, rigid, continuous metallic ring around the neck of the bottle 104 and at least one metallic magnet located on the bottle mount 106 opposite the ring, to render an audible click when the bottle 104 attaches to the bottle mount 106, to let the user know that the bottle 104 has firmly and securely attached in place.

In some aspects, the belt 102 is formed to an ergonomic shape, for example configured to be worn on the back with a wider portion in the middle, for example to distribute weight and/or pressure around the lumbar region of the user, and tapering portions near the outer edges to enhance user comfort as the belt wraps around the user's waist. In some aspects, the belt 102 is configured to reversibly close, for example with clasps 108. Optionally, the position of at least one of the clasps is adjustable on the belt 102 to customize for each user's individual needs. In some aspects, an outer layer of the belt 102 is comprised of at least one compartment.

In some aspects, the wearable modular carrying system 100 is configured for carrying different sized bottles 104. As examples, 21 ounce, 22 ounce and 24 ounce standard cycling water bottles, such as those manufactured by Specialized®.

It should be understood, that while the wearable modular carrying system 100 was designed for engagement with a magnetic bottle mounting system, such as described in co-pending patent application Ser. No. 13/462,631 entitled "Magnetic Bottle System and Methods of Use", the disclosure of which is incorporated herein by reference, it is conceived that virtually anything could be mounted to the belt using the various attachment structures and methods described herein in a modular fashion.

Figure 2:
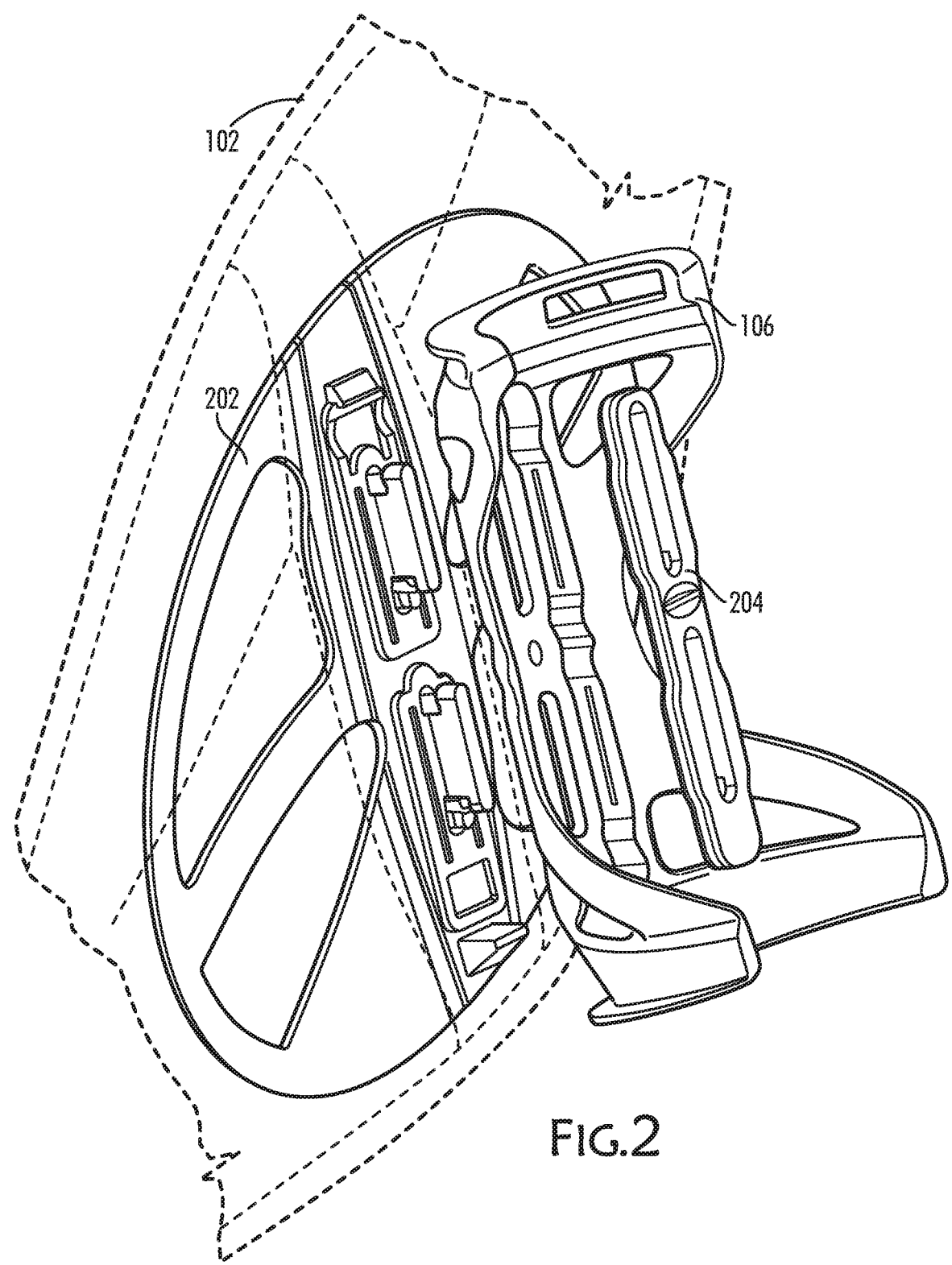
FIG. 2 is a partially exploded view of a wearable modular carrying system.

FIG. 2 is a partially exploded view of a wearable modular carrying system 100, according some aspects of the disclosure. In addition to the belt 102, bottle 104, and bottle mount 106 shown in FIG. 1, the attachment insert 202 and the locking clip 204 are shown. In an aspect of the disclosure, the attachment insert 202 is securely held within the belt 102 for example with stitching, shown more clearly in FIG. 3B. The attachment insert 202 is shown and described in more detail with respect to FIGS. 4A-4C and FIGS. 7A-8. The locking clip 204 is shown and described in more detail with respect to FIGS. 6A-6B. In some aspects, the attachment insert 202 (or any of the other attachment inserts 700, 800 described herein) is securely held within a pocket 302 formed within the belt 102, such as shown in FIG. 3C.

In some aspects of the disclosure, the locking clip 204 is not used with the wearable modular carrying system 100. The positive locking between the attachment insert 202 and the bottle mount 106 (or whatever is being attached to the attachment insert 202), as described below, creates a reliable amount of attachment force even without the application of the locking clip 204, in an aspect.

Figure 3A:
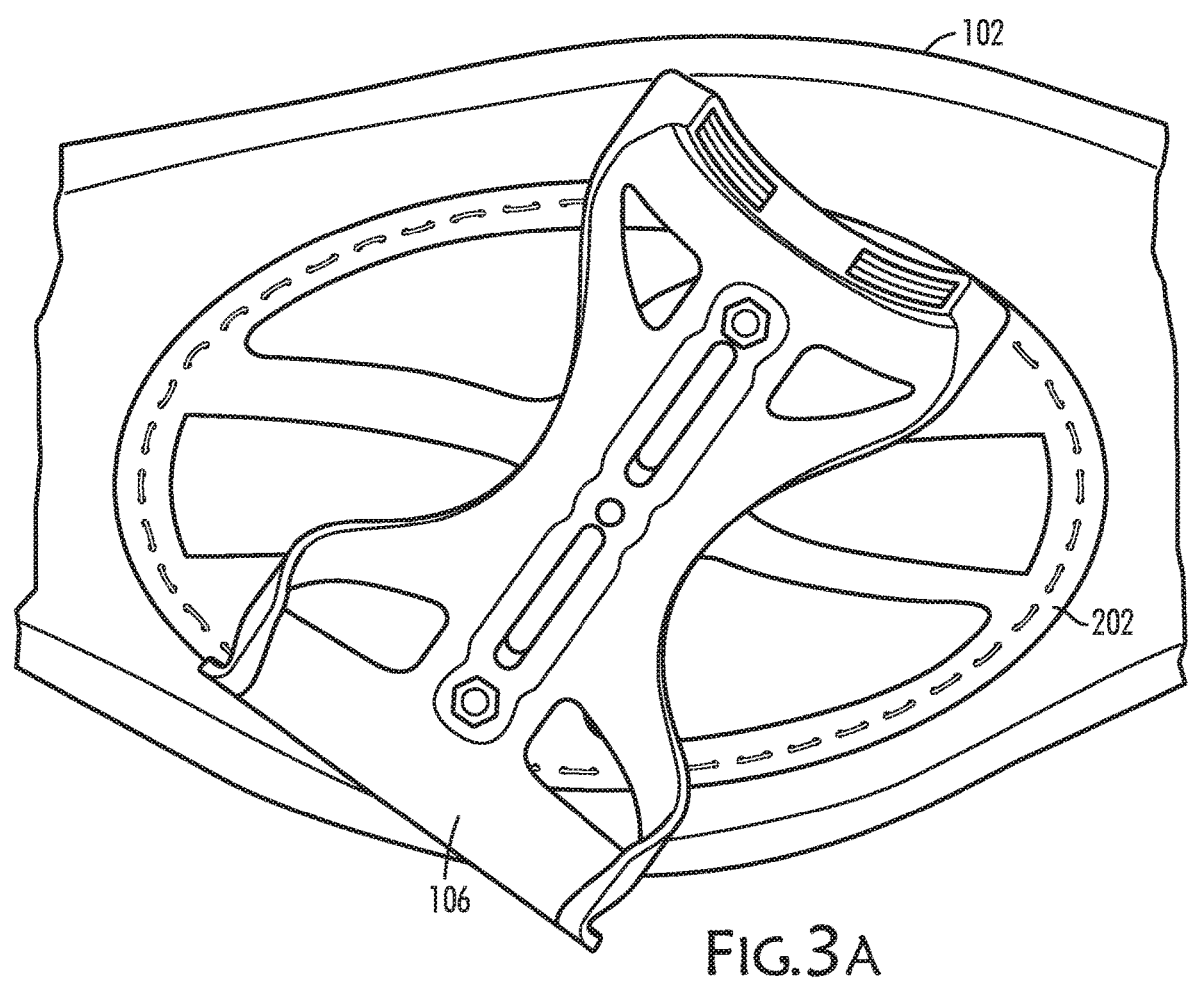
FIG. 3A is a partial cutaway, front view of a wearable modular carrying system with a bottle mount.

FIG. 3A is a partial cutaway, front view of a wearable modular carrying system 100 with the bottle mount 106, in an aspect of the disclosure. In FIG. 3A the outer layer of the belt 102, or the pocket 302 described with respect to FIG. 3C, has been removed to show the attachment insert 202 positioned on the belt 102, and in this view along with a bottle mount 106 attached to the attachment insert 202. In some aspects, the attachment insert 202 is sewn into the belt 102. In some aspects, the attachment insert 202 is secured by an adhesive to the belt 102. In some aspects, the attachment insert 202 is configured to be removable, for example being held in place by the pocket 302, such as described below.

In an aspect of the disclosure, the ovoid shape of the attachment insert 202 balances the weight of the bottle 104 so that it does not jostle while a user of the belt 102 is in motion. In an aspect, extra supporting material is provided to the attachment insert 202 between the perimeter of the ovoid shape and the center of the attachment insert 202 to add support and/or stiffness to reduce flexing of the attachment insert 202 to prevent unintended disengagement of the lock on the bottle mount 106, while also still allowing the attachment insert 202 to flex and/or form to the user's body, for example the lumbar area. In some aspects, the flexibility is altered by modifying the geometry and/or number of supports 422 (shown in more detail in FIG. 4A) and/or thickness of the material of the attachment insert 202. In an aspect, the bottle mount 106 is placed onto the attachment insert 202 and then reversibly locked into place using the locking clip 204. It should be understood that while the attachment insert 202 is shown and described as being generally ovoid in shape, just about any shape could be used in the wearable modular carrying system 100.

FIG. 3B is a front view of a wearable modular carrying system 100 without the bottle mount 106 attached.

FIG. 3C is a front view of a wearable modular carrying system 100 with a pocket 302 for securely holding an attachment insert and showing more clearly the pocket 302 in which the attachment insert is located, according to some aspects of the disclosure. In some aspects, the attachment insert 202 is removable from the pocket. In some aspects, the attachment insert is one of the attachment inserts 700, 800 described below. In some aspects, the attachment insert is secured in the pocket 302, for example by stitching and/or adhesive.

FIG. 4A is a perspective view of an attachment insert 202 of a wearable modular carrying system 100, in accordance with an aspect of the disclosure. The attachment insert 202 is configured for attachment of modular objects thereto, for example by being provided with at least one locking post 402 which is configured as a counterpart to slots 404, 602 (shown in more detail in FIG. 4C and FIG. 6A) for reversibly locking a modular object, such as the bottle mount 106, thereon. Other modular objects which could be configured to lock onto the attachment insert 202 include a basket, a container, a flashlight holder (or the flashlight itself), a holster, a tool holder (or the tool itself), as examples.

Elsewhere herein it is described that the attachment insert 202 is ovoid in shape, but it should be understood that the shape and/or size are variable depending on the intended use and/or the size and/or weight of the object which will be attached to the attachment insert 202.

It should also be understood that while the attachment insert 202 is described as being incorporated into a belt, it is conceived that the attachment inserts 202, 700, 800 described herein could be used in combination with something else, for example an article of clothing, a backpack, a seat, a wall, a vehicle and the like, for mounting modular objects thereto.

Figure 4B:
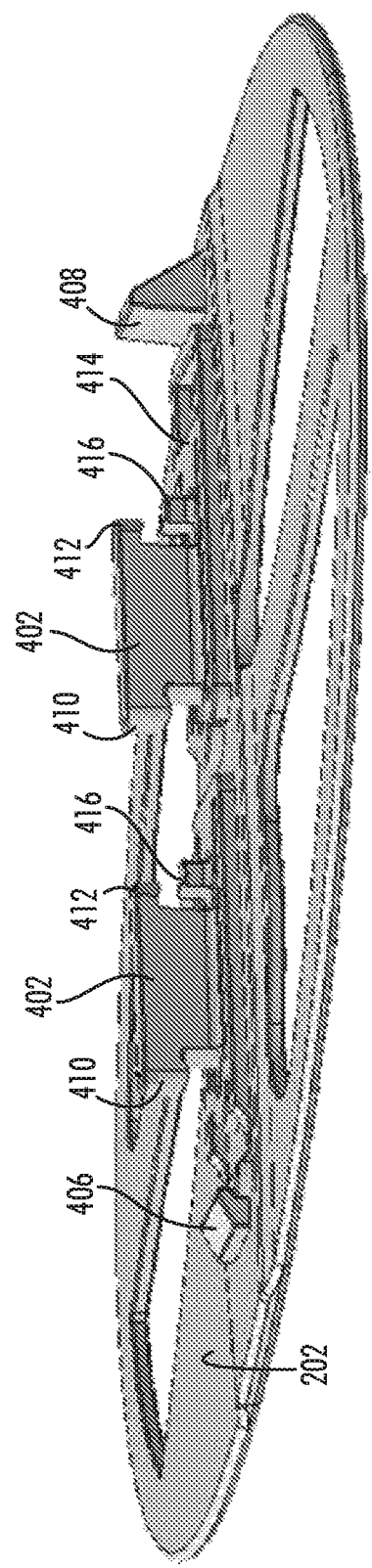
FIG. 4B is a perspective side view of an attachment insert of a wearable modular carrying system.
Figure 5A:
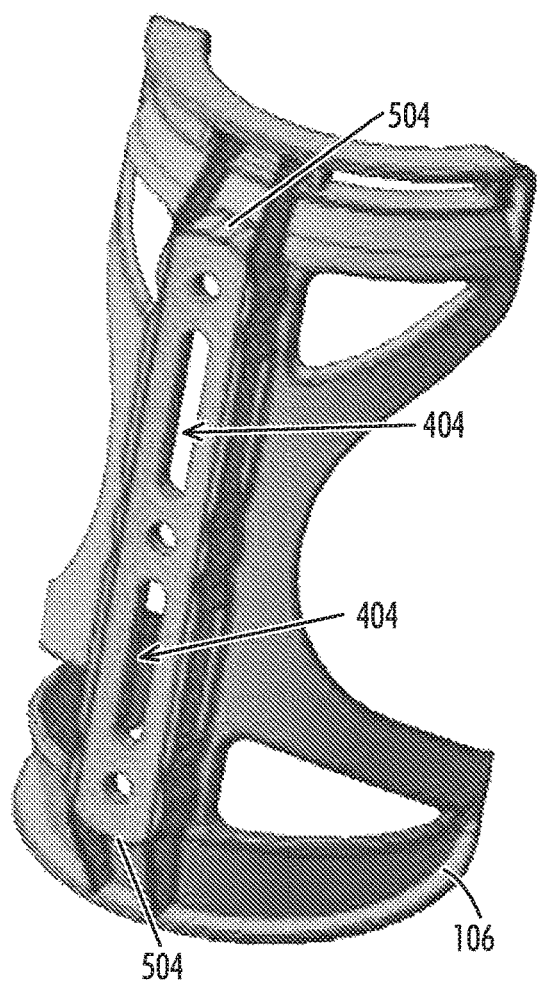
FIGS. 5A-5D are views of a bottle mount of a wearable modular carrying system.
Figure 5B:
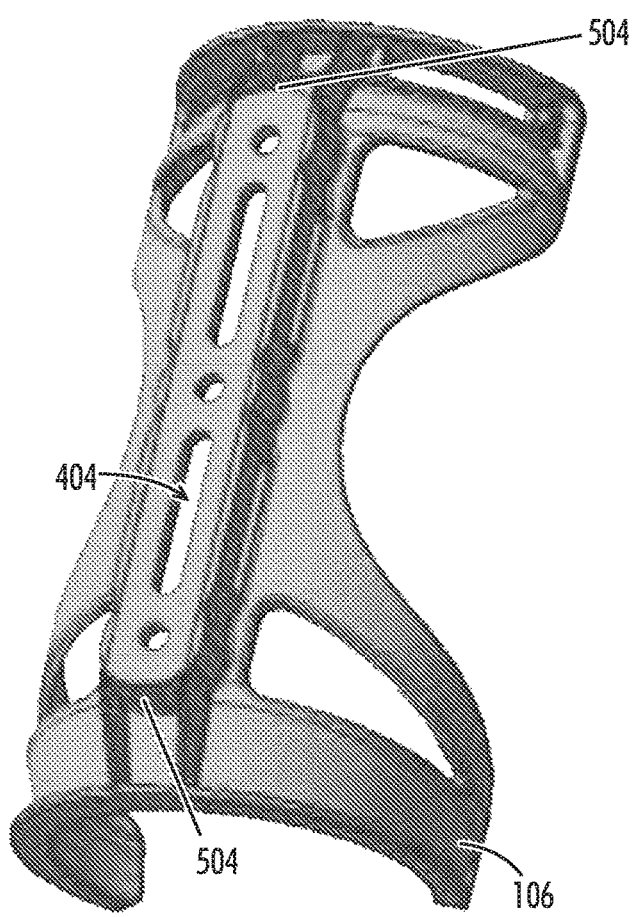
Figure 5C:
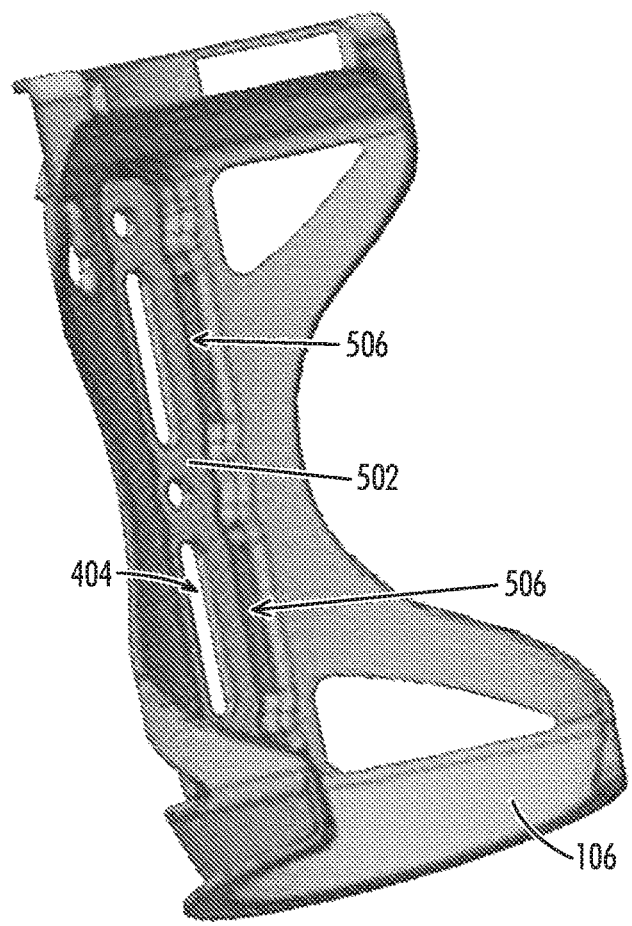
Figure 5D:
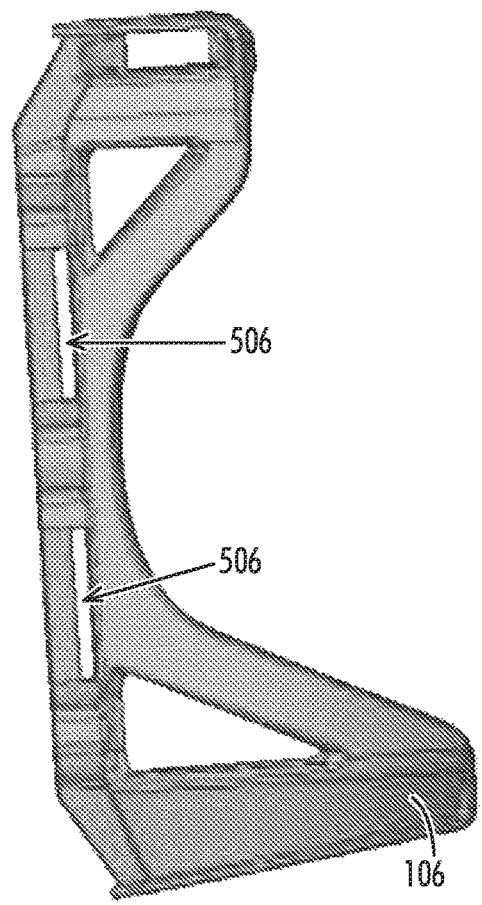

FIG. 4B is a perspective side view of an attachment insert 202 of a wearable modular carrying system 100, in accordance with an aspect of the disclosure. The side perspective enables a better view of the attachment insert 202 features which enable the attachment of an object thereto, such as the bottle mount 106, in an aspect. In an aspect of the disclosure, the bottle mount 106 attaches to the attachment insert 202 through positive contact between them, such that a mount inner surface 502 and end blocks 504 (shown in FIGS. 5A-5B) are interlaced between a top latch 406, a bottom wedge 408 and a top post prong 410 of each locking post 402. In an aspect, when the locking clip 204 is properly engaged onto a bottom post prong 412 of each locking post 402, the locking clip 204 is interlaced between the attachment insert 202 and the bottle mount 106 through positive contact with the bottom post prongs 412 and the mount inner surface 502, while also interlacing the bottle mount 106 and the attachment insert 202 through positive contact onto the mount inner surface 502 which, in turn, creates positive contact between the mount inner surface 502 of the bottle mount 106 and the top surface 414 of the attachment insert 202.

In an aspect, when the attachment insert 202 is fully engaged with the bottle mount 106, the bottle mount is locked between multiple stabilizing points, namely, the top latch 406, the bottom wedge 408, the top post prongs 410, the bottom post prongs 412 and at least one spacer 416. In an aspect, the top latch 406, the bottom wedge 408 and the at least one spacer 416 prevent the bottle mount 106 from moving longitudinally, and the top post prongs 410 and the bottom post prongs 412 prevent the bottle mount 106 from moving laterally. In an aspect, the configuration of the bottle mount 106 in combination with the attachment insert 202 is such that the surfaces of them are mechanically pulled flush during locking.

Figure 4C:
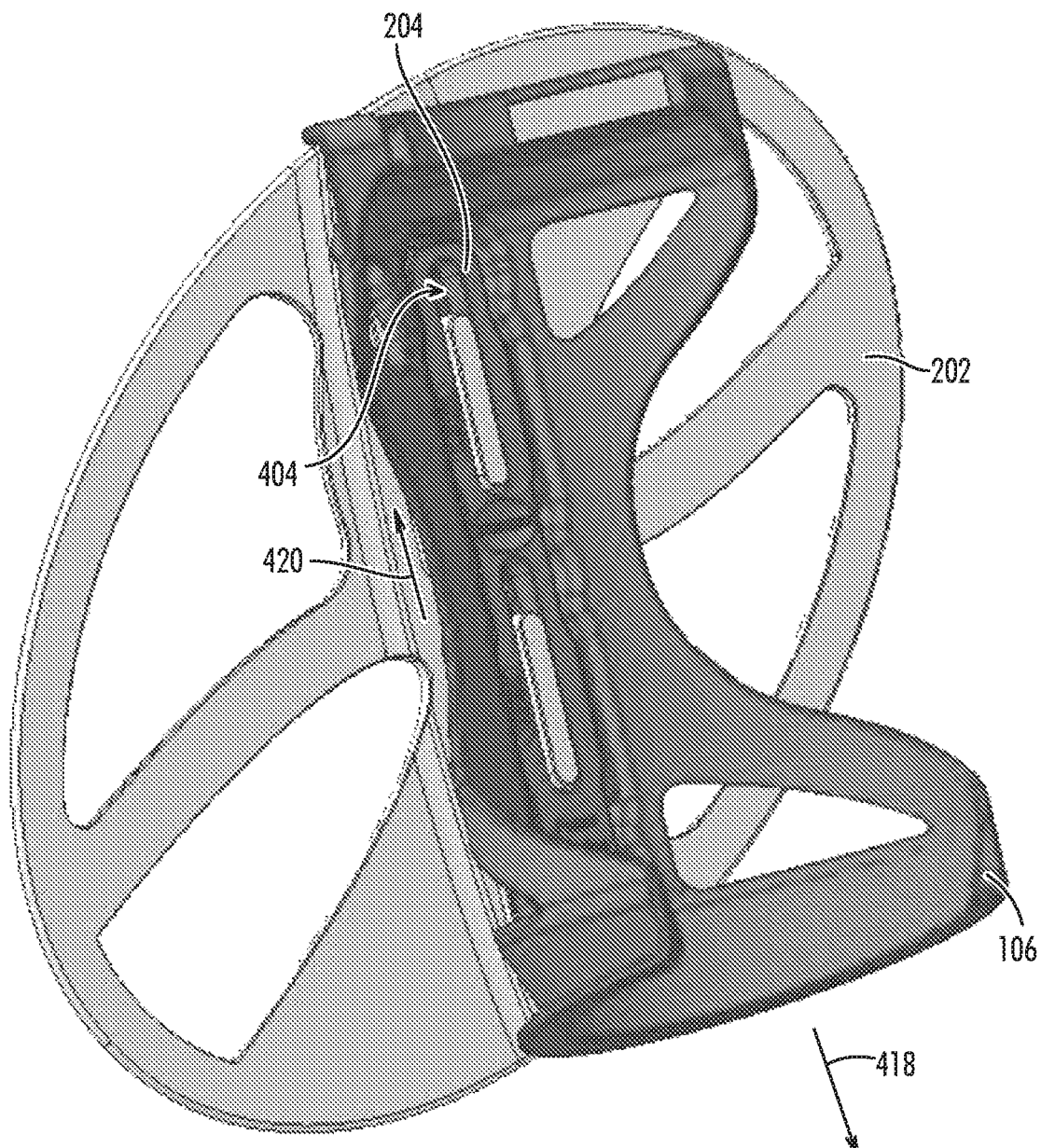
FIG. 4C is a perspective view of an attachment insert with a bottle mount attached.

FIG. 4C is a perspective view of an attachment insert 202 with a bottle mount 106 attached using the locking clip 204, in accordance with an aspect of the disclosure. In an aspect, the bottle mount 106 and locking clip 204 recess at least partially into the attachment insert 202. In practice and as described in more detail with respect to FIG. 9, manual force is applied to the bottle mount 106 in a downward direction 418, which reversibly attaches the bottle mount 106 onto the attachment insert 202. Then the locking clip 204 slides upwards 420 to optionally reinforce the attachment of the bottle mount 106 to the attachment insert 202.

FIGS. 5A-5D are views of a bottle mount 106 of a wearable modular carrying system 100, in accordance with an aspect of the disclosure. In addition to the features already described herein, the bottle mount 106 is configured with at least one sliding slot 506 designed as a counterpart to a slide 604 (shown and described with respect to FIGS. 6A-6B.).

Figure 6A:
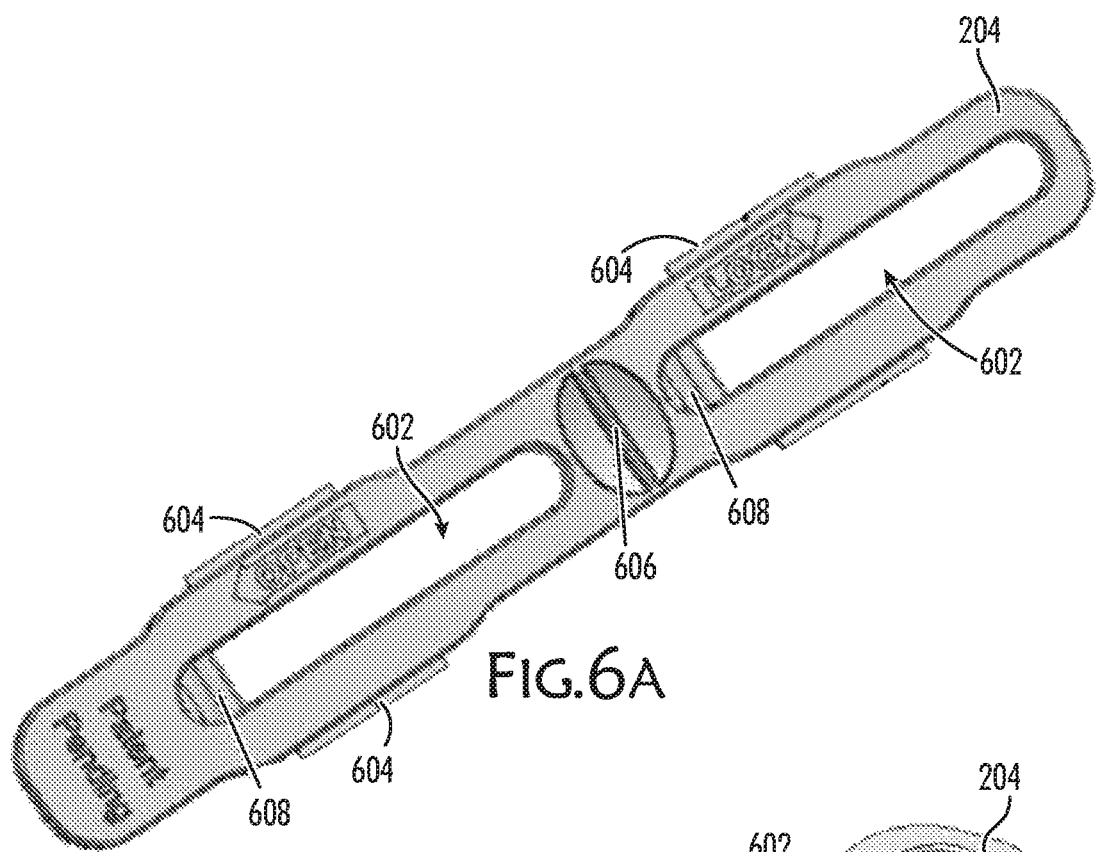
FIGS. 6A-6B are views of a locking clip of a wearable modular carrying system.
Figure 6B:
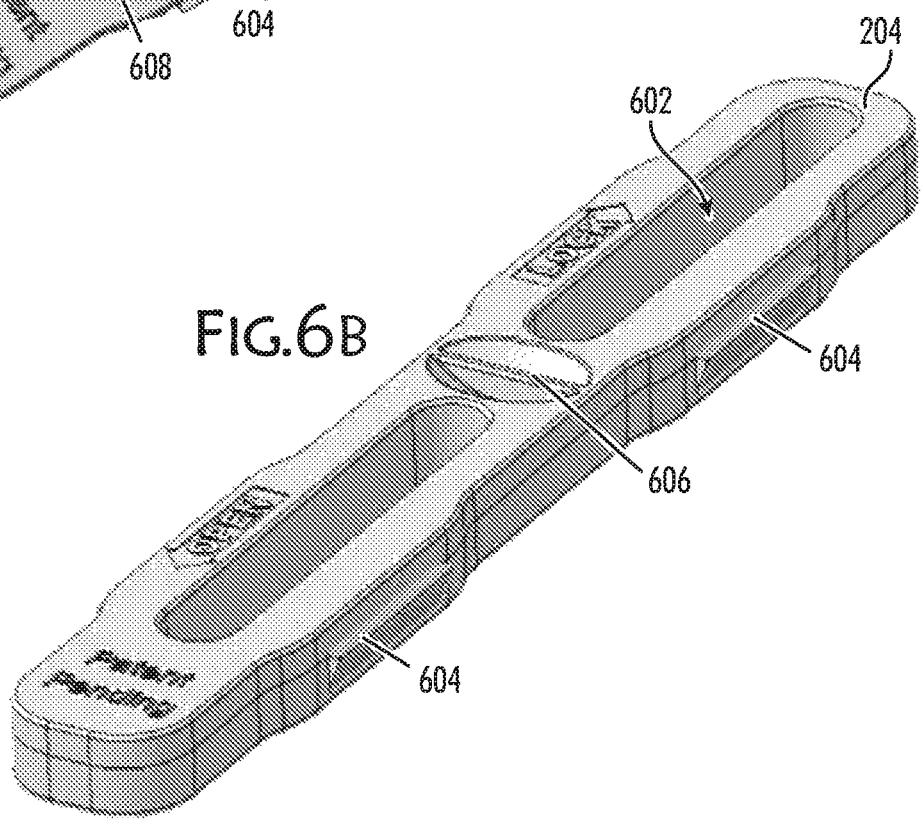
Figure 7B:
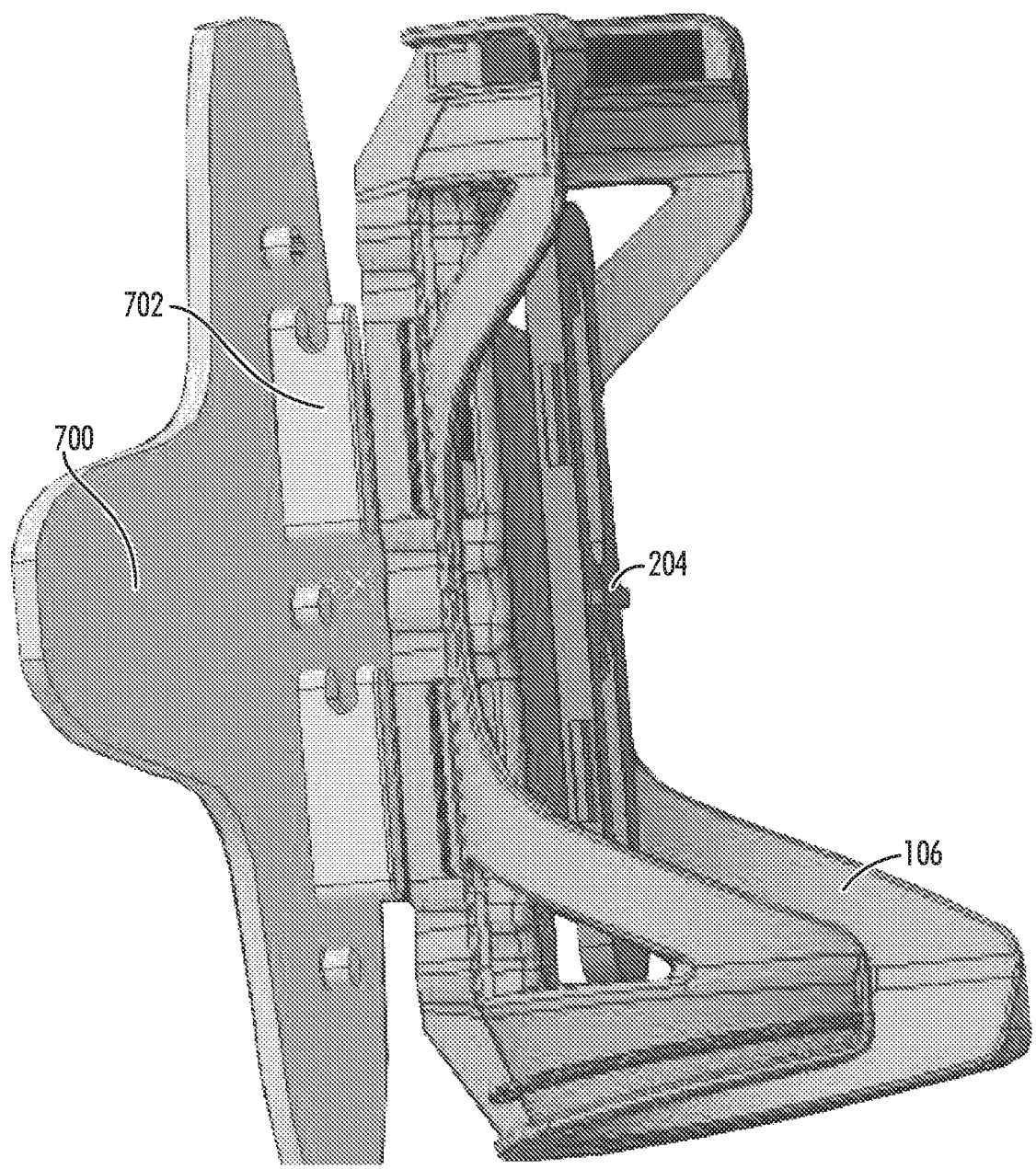
Figure 7C:
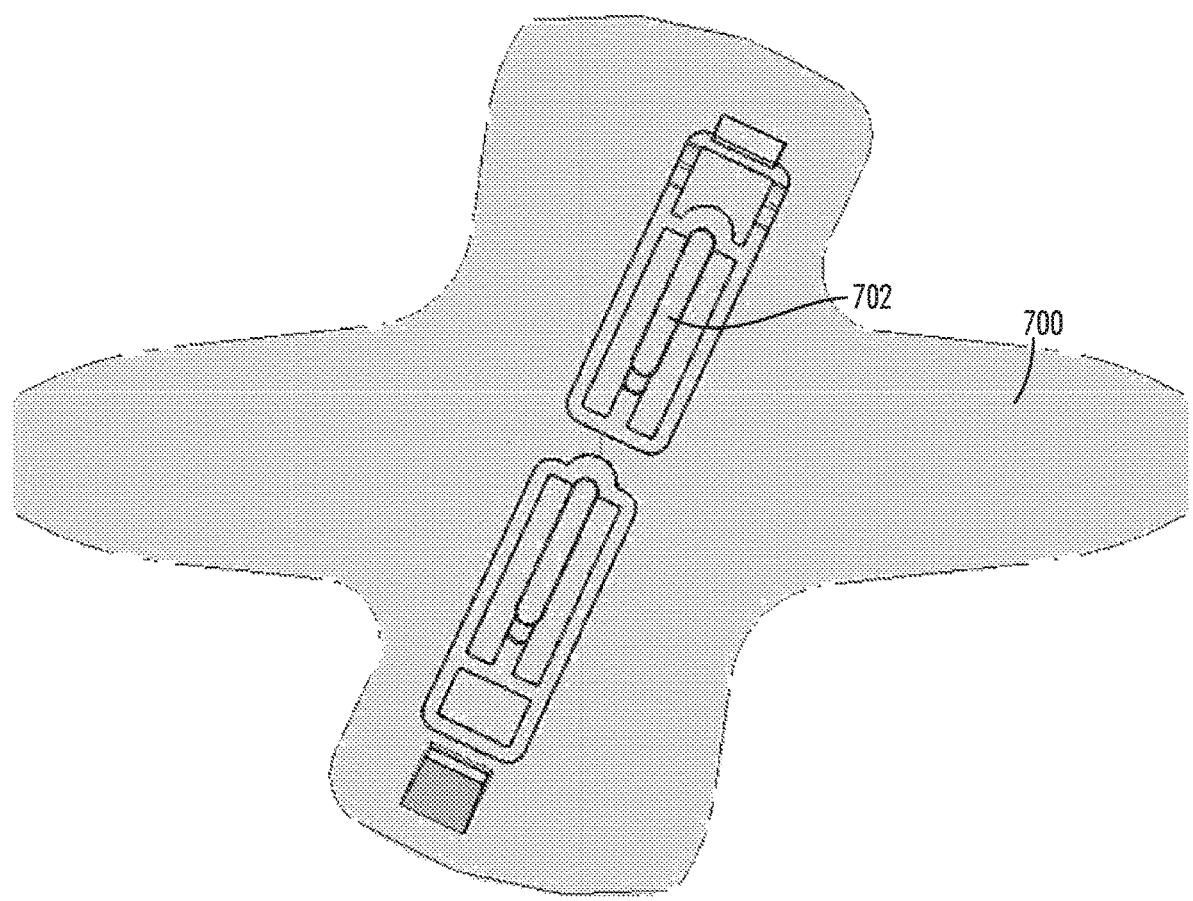

FIGS. 6A-6B are views of a locking clip 204 of a wearable modular carrying system 100, in accordance with an aspect of the disclosure. In an aspect of the disclosure, the locking clip 204 is provided with a user interface feature 606, for example a handle, dimple, knob, and/or tab, to facilitate user movement of the locking clip 204. In an aspect, a clip tab 608 rests underneath the bottom post prongs 412 of the attachment insert 202. In an aspect, similar to the engagement of the attachment insert 202 with the bottle mount 106, the engagement of the locking clip 204 is designed to further reinforce the attachment of the bottle mount 106 and optionally to provide rigidity to counter the flexibility of the attachment insert 202.

FIGS. 7A-7D are views of an extruded surface attachment insert 700 of a wearable modular carrying system 100. In an aspect, the extruded surface attachment insert 700 is used in place of attachment insert 202. In an aspect, the extruded surface attachment insert 700 is x-shaped rather an ovoid but still includes locking posts 702. In an aspect, the length and width of the legs of the x-shape determine the weight distribution and balance of the modular object attached to the extruded surface attachment insert 700.

FIG. 8 is a key-hole attachment insert 800 of a wearable modular carrying system 100. The key-hole insert 800, has keyholes 802 so that modular objects may be fastened to the key-hole attachment insert 800, for example using threaded bolts (such as shown in FIG. 3A). The keyhole is larger at one end so that the head of a bolt may be recessed into the back side of the key-hole attachment insert 800. This allows for the bottle mount 106 to be tightly fastened to the key-hole attachment insert 800, in an aspect.

Figure 9:
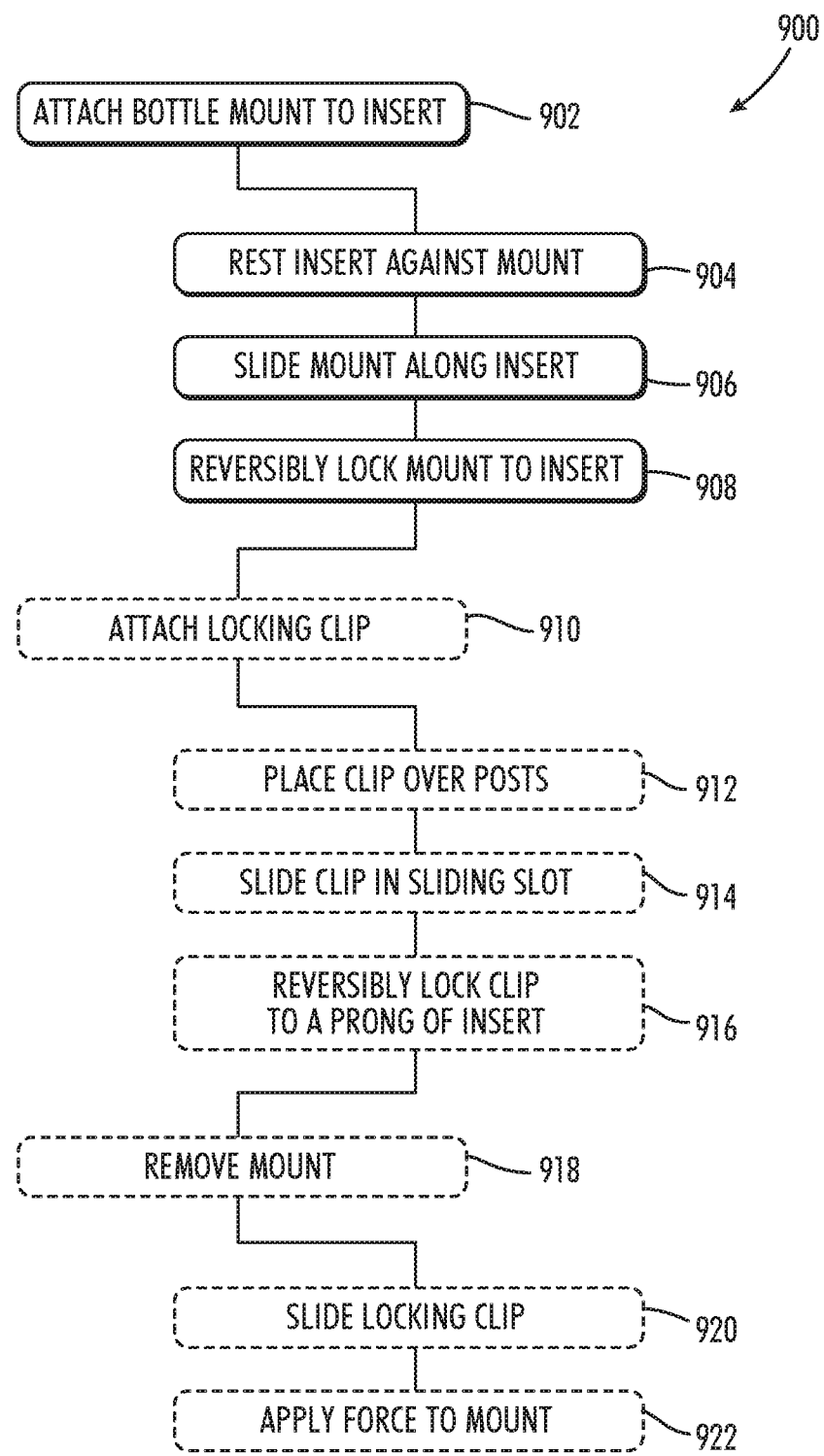

FIG. 9 is a flowchart of a method (900) of using a wearable modular carrying system 100, in accordance with an aspect of the disclosure. In an aspect, the process of attaching a bottle mount 106 to the attachment insert 202 is generally a two-step process. The first step involves attaching (902) the bottle mount 106 to the attachment insert 202. The bottle mount 106 mechanically attaches to the attachment insert 202 by first resting (904) the top surface 414 of the attachment insert 202 against the back of bottle mount 106 (on the opposite side of the mount inner surface 502), so that the two objects are nested/interlaced together with the top post prongs 410 and the bottom post prongs 412 of the attachment insert 202 placed inside and through the slots 404 of the bottle mount 106. In order to lock the bottle mount 106 together with the attachment insert 202, force is applied to the bottle mount 106, sliding (906) the bottle mount 106 longitudinally along the surface of the attachment insert 202 in the direction of the bottom wedge 408 of the attachment insert 202. The surface of the attachment insert 202 is designed to flex so that end blocks 504 of the bottle mount 106 can slide between the top latch 406 and the bottom wedge 408 of the attachment insert 202.

In an aspect, when the attachment insert 202 flexes, this will also cause at least one top post prong 410 of the attachment insert 202 to reversibly lock (908) onto the mount inner surface 502 of the bottle mount 106. When the attachment insert 202 is fully engaged, the bottle mount 106 will be locked between multiple stabilizing points (such as described above) of the attachment insert 202. During this locking process, the features of the bottle mount 106 and attachment insert 202 are designed so that all the surfaces are mechanically pulled tightly flush.

In an aspect, the second, optional, step involves attaching (910) the locking clip 204 onto the wearable modular carrying system 100 to secure the bottle mount 106. In an aspect, the locking clip 204 is placed (912) over the locking posts 402 of the attachment insert 202. In an aspect, at least one slide 604 of the locking clip 204 slides (914) along the sliding slot 506 of the bottle mount 106 until the clip tab 608 of the locking clip 204 fully locks (916) onto at least one bottom post prong 412 of the attachment insert 202. At least one slide 604 of the locking clip 204 is configured so that the locking clip 204 can be pressed into sliding slot 506 of the bottle mount 106. Once in place, the locking clip 204 may slide freely inside mount inner surface 502 of the bottle mount 106. The ability of the locking clip 204 to slide is bound by the length of the sliding slot 506 of the bottle mount 106, in an aspect of the disclosure.

The bottle mount may optionally be removed (918) from the wearable modular carrying system 100 so that the bottle mount 106 can be attached to a bicycle, for example as depicted in U.S. patent application Ser. No. 13/462,631, entitled "Magnetic Bottle System and Methods of Use." In an aspect, the bottle mount 106 is removed (918) from the attachment insert 202 by sliding (920) the locking clip 204 in the opposite direction in which it was locked (that is moving the locking clip 204 in a downward 418 direction). After the locking clip 204 is disengaged, force is applied (922) to the bottom of the bottle mount 106, sliding it upward. The bottle mount 106 and the locking clip 204 will then disengage.

Manufacturing

In an aspect, attachment inserts 202, 800 are made by using a plasma cutter, water jet, or an injection molding tool, as examples. For the extruded surface attachment insert 700, the insert 700 is manufactured using an injection molding tool or a die and cast, as examples. It may also be feasible for any of these components to be made using 3D printers.

As described above, the attachment insert is sewn or adhered into the fabric of the belt 102. However, it may be feasible to use heat or a resin to fuse the materials together. Alternatively, the attachment insert may be integrated into the fabric by putting the attachment insert into the pocket 302 that leaves the key-holes 802 or locking posts 702 exposed.

It is foreseeable that the attachment insert and the bottle mount (or other attached object) may be manufactured as one fully integrated component. It is also foreseeable that the wearable modular carrying system could be designed such that magnets are embedded into the fabric of the waist pack so that it would not be necessary to have an attachment insert or a bottle mount. Such a design would allow the bottle, having a magnetic contact point to simply attach to the belt 102 directly.

The attachment insert may be made from of a variety of materials such as carbon, metal, wood, and/or plastic. Likewise, the locking clip 204 may be made from any of the materials previously mentioned.

In some aspects, it is possible for the attachment insert to be configured to support more than one bottle mount 106.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range. Further, described ranges are intended to include numbers outside any range described within statistical error and/or inherent measurement equipment limitations.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A wearable modular carrying system, comprising:
   a belt;
   an attachment insert held next to the belt and including at least one locking post with one of a top post prong or a bottom post prong, and a key-hole;
   a modular object comprising at least one of a magnetic bottle mount and magnetically active bottle combination, a basket, a holder, a tool holder, a flashlight holder; and,
   a locking clip including at least one slot sized and shaped as a counterpart to the locking post of the attachment insert and wherein the locking clip is disposed on a side of the modular object such that the modular object is bracketed between the locking clip and the attachment insert, wherein the locking clip includes a clip tab reversibly engagable to the attachment insert.

2. A wearable modular carrying system according to claim 1, wherein a removable, metallic, continuous ring is disposed around a neck the magnetically active bottle and the magnetic bottle mount includes at least one magnet at a location on the bottle mount corresponding to the ring on the bottle when the bottle is seated in the bottle mount.

3. A wearable modular carrying system according to claim 1, wherein the attachment insert is held next to the belt by at least one of stitching, fusing and adhesive.

4. A wearable modular carrying system according to claim 1, wherein the at least one locking post of the attachment insert, the modular object and the locking clip interlace when reversibly attached together.

5. A wearable modular carrying system according to claim 1, wherein the top post prong and the bottom post prong of the at least one locking post are of different configurations.

6. A wearable modular carrying system according to claim 1, wherein the attachment insert is held next to the belt by a pocket sized and shaped for placement of the attachment insert therein.

7. A wearable modular carrying system according to claim 1, wherein the attachment insert is ovoid shaped for distributing the weight of the modular object therearound.

8. A wearable modular carrying system according to claim 7, wherein the attachment insert is provided with at least one support to provide flexibility control.

9. A wearable modular carrying system according to claim 1, wherein the attachment insert is x-shaped for distributing the weight of the modular object among the extensions of the x-shape.

10. A wearable modular carrying system according to claim 1, wherein the magnetic bottle mount includes at least one slide slot in which a slide of the locking clip is positioned, where the dimensions of the slide slot define the movement of the locking clip.

11. A wearable modular carrying system according to claim 1, wherein the attachment insert further comprises a top latch, a bottom wedge and at least one spacer.

12. A wearable modular carrying system according to claim 11, wherein the modular object locks onto the attachment insert between multiple stabilizing points.

13. A wearable modular carrying system according to claim 12, wherein the multiple stabilizing points include at least one of the top latch, the bottom wedge, the at least one spacer, the top post prong and the bottom post prong.

14. A wearable modular carrying system according to claim 13, wherein at least one of the top latch, the bottom wedge and the at least one spacer prevent the modular object from moving longitudinally, and at least one of the top post prong and the bottom post prong prevent the modular object from moving laterally.

15. A wearable modular carrying system according to claim 1, wherein the locking clip includes a user interface feature.

16. A method of using a wearable modular carrying system, comprising:
   attaching a modular object comprising at least one of a magnetic bottle mount and magnetically active bottle combination, a basket, a holster, a tool holder, a flashlight holder, to an attachment insert including at least one locking post by,
      resting a top surface of the attachment insert against the back surface of the modular object so that the at least one locking post of the attachment insert is placed within and through a slot of the modular object,
      sliding the modular object longitudinally along the top surface of the attachment insert, and,
      reversibly locking the modular object onto the attachment insert by sliding a portion of the modular object under a top post prong of the locking post;
   attaching a locking clip to the system to reversibly lock the modular object to the attachment insert by,
      placing the locking clip over the at least one locking post of the attachment insert and abutting an inner surface of the modular object, such that the modular object is between the attachment insert and the locking clip, that is, the locking clip is disposed on a side of the modular object opposite the attachment insert, and the locking post is placed in and through a slot in the locking clip sized and shaped as a counterpart to the locking post of the attachment insert,
      sliding the locking clip along the inner surface of the modular object, and,
      reversibly locking the locking clip onto the attachment insert, with the modular object therebetween, by sliding a clip tab of the locking clip under a bottom post prong of the locking post.

17. A method of using a wearable modular carrying system according to claim 16, further comprising:
   removing the modular object from the wearable modular carrying system by,
      sliding the locking clip such that a clip tab of the locking clip becomes dislodged from a bottom post prong of the locking post, and,
      applying sliding force to the modular object to dislodge it from the top post prong of the locking post.

* * * * *